(12) United States Patent
Wood

(10) Patent No.: US 8,433,037 B1
(45) Date of Patent: *Apr. 30, 2013

(54) X-RAY RADAR

(75) Inventor: James Richard Wood, Grapevine, TX (US)

(73) Assignee: Lockheed Martin Corp, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,548

(22) Filed: Oct. 23, 2009

Related U.S. Application Data

(63) Continuation-in-part of application No. 12/541,539, filed on Aug. 14, 2009.

(60) Provisional application No. 61/107,924, filed on Oct. 23, 2008.

(51) Int. Cl.
*G01N 23/203* (2006.01)

(52) U.S. Cl.
USPC .................... 378/86; 378/57; 378/70; 378/87

(58) Field of Classification Search .................... 378/57, 378/70, 86, 87
See application file for complete search history.

(56) References Cited

U.S. PATENT DOCUMENTS

| | | | |
|---|---|---|---|
| 4,035,616 A | 7/1977 | Piringer | 235/78 RC |
| 4,935,616 A | 6/1990 | Scott | 250/213 VT |
| 5,044,006 A | 8/1991 | Cyrulnik | 378/145 |
| 5,206,592 A | 4/1993 | Buess et al. | 324/307 |
| 5,592,083 A | 1/1997 | Magnusson | 324/300 |
| 5,608,403 A * | 3/1997 | Miller | 342/13 |
| 5,635,721 A | 6/1997 | Bardi | 250/492.3 |
| 5,642,393 A | 6/1997 | Krug et al. | 378/57 |
| 5,696,577 A | 12/1997 | Stettner et al. | 356/4.01 |
| 5,751,830 A | 5/1998 | Hutchinson | 382/103 |
| 5,754,290 A | 5/1998 | Rajic et al. | 356/328 |

(Continued)

FOREIGN PATENT DOCUMENTS

JP 5-142396 6/1996

OTHER PUBLICATIONS

U.S. Appl. No. 12/541,539, entitled "X-Ray Explosive Imager", filed Aug. 14, 2009, in the name of the inventor J. Richard Wood.

(Continued)

*Primary Examiner* — Thomas R Artman
(74) *Attorney, Agent, or Firm* — Lee, Jorgensen, Pyle & Kewalramani, P.C.

(57) ABSTRACT

A technique for generating three-dimensional information using radio frequency modulated X-rays includes both a method and an apparatus. In a first aspect, the method includes modulating an X-ray signal with first and second radio frequencies; transmitting the modulated X-ray signal; receiving backscatter; and processing the received backscatter to range a target in the field of view. In another aspect, an apparatus includes a transmitter and a receiver. The transmitter is capable of: modulating an X-ray signal with first and second radio frequencies and transmitting the modulated X-ray signal into a field of view. The receiver is capable of receiving backscatter from the transmitted X-ray signal. Other aspects include variations on these. For example, some aspects are computer implemented, such as a software implemented method, a program storage medium encoded with instruction to perform such a method, and a computing apparatus performed to program such a method.

36 Claims, 8 Drawing Sheets

U.S. PATENT DOCUMENTS

| | | | | |
|---|---|---|---|---|
| 5,760,403 | A | 6/1998 | Elabd | 250/370.11 |
| 6,088,423 | A | 7/2000 | Krug et al. | 378/57 |
| 6,194,898 | B1 | 2/2001 | Magnuson et al. | 324/300 |
| 6,952,163 | B2 | 10/2005 | Huey et al. | 340/521 |
| 7,023,956 | B2 | 4/2006 | Heaton et al. | 378/57 |
| 7,130,371 | B2 * | 10/2006 | Elyan et al. | 378/57 |
| 7,135,672 | B2 | 11/2006 | Land | 250/221 |
| 7,142,109 | B1 | 11/2006 | Frank | 340/539.26 |
| 7,231,017 | B2 | 6/2007 | Gertsenshteyn | 378/87 |
| 7,317,390 | B2 | 1/2008 | Huey et al. | 340/552 |
| 7,327,137 | B1 | 2/2008 | Crowley | 324/300 |
| 7,344,304 | B2 * | 3/2008 | Hardesty | 378/205 |
| 7,368,292 | B2 | 5/2008 | Hummel et al. | 436/171 |
| 7,385,549 | B2 | 6/2008 | Lovberg et al. | 342/22 |
| 7,433,054 | B1 | 10/2008 | Tischhauser et al. | 356/519 |
| 7,453,552 | B1 | 11/2008 | Miesak | 356/4.01 |
| 7,646,851 | B2 * | 1/2010 | Liu et al. | 378/98.9 |
| 2003/0144800 | A1 | 7/2003 | Davis et al. | 702/22 |
| 2004/0165187 | A1 | 8/2004 | Koo et al. | 356/445 |
| 2004/0257224 | A1 | 12/2004 | Sajkowsky | 340/539.13 |
| 2005/0079386 | A1 | 4/2005 | Brown, Jr. | 428/690 |
| 2005/0099292 | A1 | 5/2005 | Sajkowsky | 340/539.13 |
| 2005/0104603 | A1 | 5/2005 | Peschmann et al. | 324/637 |
| 2006/0022140 | A1 | 2/2006 | Connelly et al. | 250/338.1 |
| 2006/0145812 | A1 | 7/2006 | Sajkowsky | 340/5.81 |
| 2007/0008135 | A1 | 1/2007 | Sajkowsky | 340/572.1 |
| 2007/0025512 | A1 | 2/2007 | Gertsenshteyn | 378/86 |
| 2007/0211922 | A1 | 9/2007 | Crowley et al. | 382/115 |
| 2008/0111545 | A1 | 5/2008 | Crowley | 324/234 |
| 2008/0120430 | A1 | 5/2008 | Redmond | 709/231 |

OTHER PUBLICATIONS

U.S. Appl. No. 12/604,626 entitled "3D X-Ray Microscopy Imaging System", filed Oct. 23, 2009, in the name of Mark K. Browder.

U.S. Appl. No. 12/605,002 entitled "3D X-Ray Reflection Microscopy Imaging System", filed Oct. 23, 2009, in the name of J. Richard Wood.

M. R. Carter, et al., "A Microchannel Plate Intensified, Subnanosecond, X-ray Imaging Camera", 41 *Physica Scripta* 390-395 (1990), for its teachings regarding the design, construction, and operation of MCP assemblies.

* cited by examiner

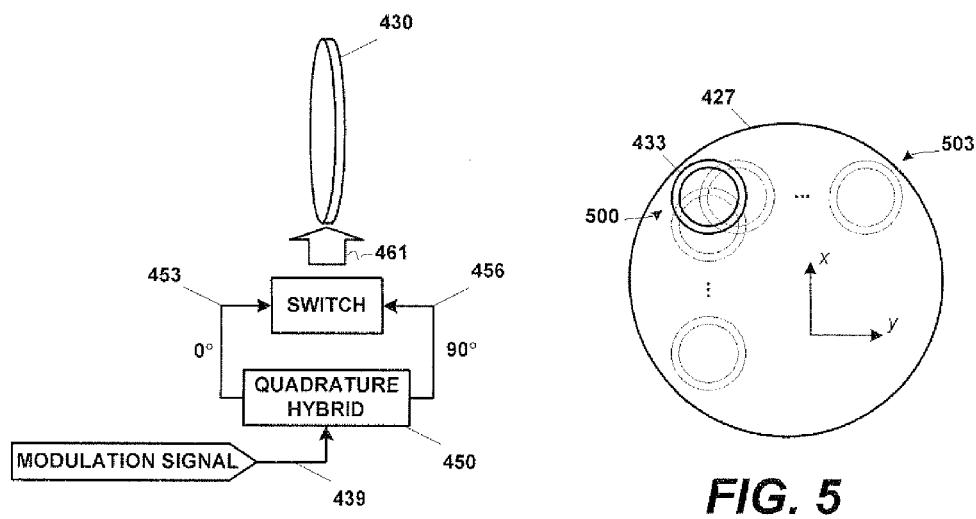
FIG. 4C
FIG. 5
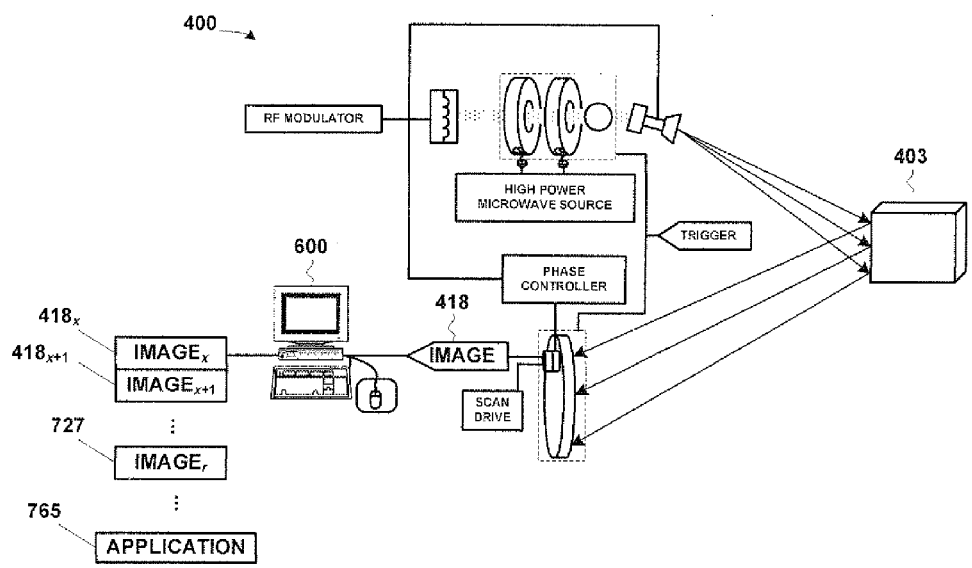
FIG. 6

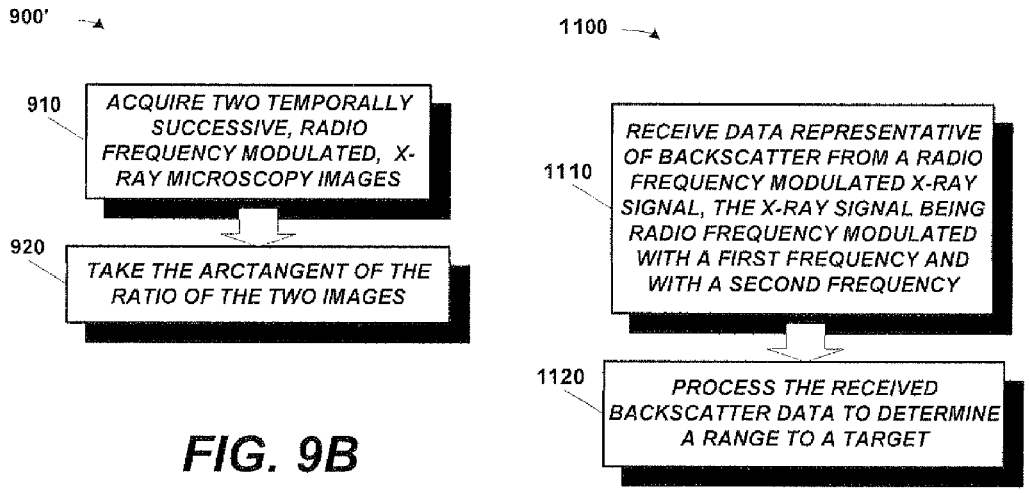
FIG. 9B
FIG. 11
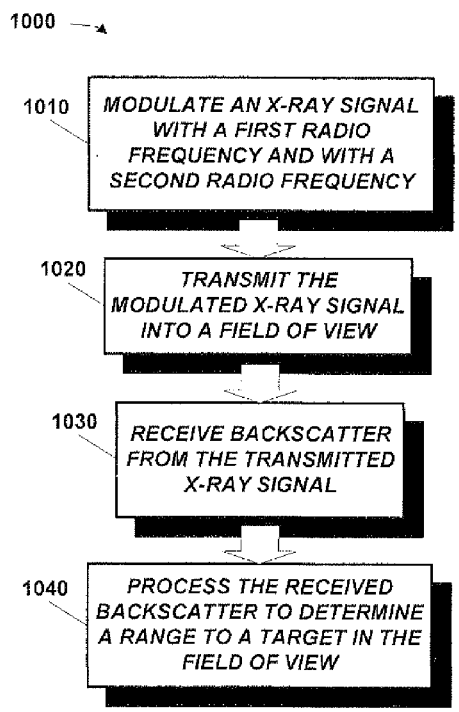
FIG. 10

X-RAY RADAR

The priority of U.S. Provisional Application Ser. No. 61/107,924, entitled "X-Ray RADAR", filed Oct. 23, 2008, in the name of the inventor J. Richard Wood is hereby claimed under 35 U.S.C. §119(e). This application is also hereby incorporated by reference for all purposes as if set forth verbatim herein.

This is a continuation-in-part of U.S. application Ser. No. 12/541,539, entitled "X-Ray Explosive Imager", filed Aug. 14, 2009, in the name of the inventor J. Richard Wood. The earlier effective filing date of this application is hereby claimed under 35 U.S.C. §120 for all common subject matter. This application is also hereby incorporated by reference for all purposes as if set forth verbatim herein.

BACKGROUND OF THE INVENTION

1. Field of the Invention

The present invention pertains to remote sensing, and, more particularly, to detection and ranging using X-rays.

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

Conventional three-dimensional ("3D") X-ray images require multiple exposures at multiple angles to image 3D structures. The ability to have portable 3D X-ray systems is limited by the large detector arrays needed for multiple angle imaging, and the size of the imaging volume within the X-ray apparatus.

The present invention is directed to resolving, or at least reducing, one or all of the problems mentioned above.

SUMMARY OF THE INVENTION

The present invention is a technique for generating three-dimensional information using radio frequency modulated X-rays.

In a first aspect, the presently disclosed technique includes a method, comprising: modulating an X-ray signal with a first radio frequency and with a second radio frequency; transmitting the modulated X-ray signal into a field of view; receiving backscatter from the transmitted X-ray signal; and processing the received backscatter to determine a range to a target in the field of view.

In a second aspect, the presently disclosed technique includes a software implemented method, comprising: receiving data representative of backscatter from a radio frequency modulated X-ray signal, the X-ray signal being radio frequency modulated with a first frequency and with a second frequency; and processing the received backscatter data to determine a range to a target.

In a third aspect, the presently disclosed technique includes a computing apparatus, comprising: a processor; a bus system; a storage communicating with the processor over the bus system; and an application residing on the storage. The application, when invoked by the processor, performs a software implemented method. The software implemented method comprises: receiving data representative of backscatter from a radio frequency modulated X-ray signal, the X-ray signal being radio frequency modulated with a first frequency and with a second frequency; and processing the received backscatter data to determine a range to a target.

In a fourth aspect, the presently disclosed technique includes an apparatus, comprising: a transmitter and a receiver. The transmitter is capable of: modulating an X-ray signal with a first radio frequency and with a second radio frequency; and transmitting the modulated X-ray signal into a field of view. The receiver is capable of receiving backscatter from the transmitted X-ray signal.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which:

FIG. 4C illustrates a phase controller for the microchannel plate of the X-ray RADAR imaging system implemented as shown in FIG. 4B;

FIG. 5 illustrates the scanning of the detector array across the back of the microchannel plate in the sensor of the embodiment in FIG. 4;

FIG. 6 depicts a second embodiment wherein the X-ray RADAR imaging system of FIG. 4B is deployed with a computing apparatus for image processing;

FIG. 9B illustrates a second particular embodiment of method for acquiring and processing X-ray RADAR images;

FIG. 10-FIG. 11 illustrate two methods in different aspects of the present invention;

Figure 1:
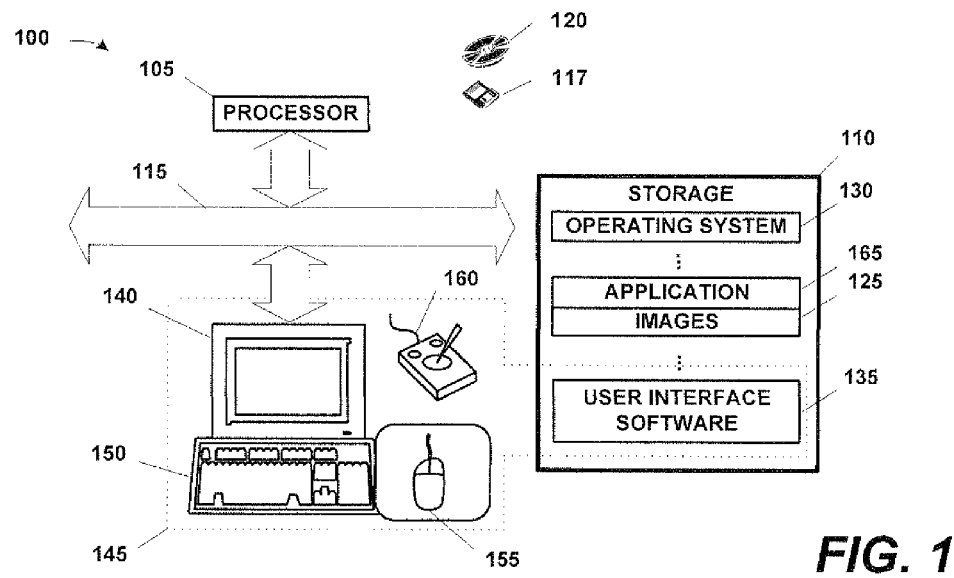
FIG. 1 shows selected portions of the hardware and software architecture of a computing apparatus such as may be employed in some aspects of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

In the presently disclosed technique, the radio frequency modulation of a high voltage, high energy tube is applied across the two faces of a micro channel plate ("MCP"), creating a biasing of the plate that changes with the phase of the applied radio frequency energy. The electron beam energy within the radio frequency tube generates X-rays when electrons strike and decelerate into the beam dump within the tube. The electron beam is amplitude modulated with the radio frequency phase information, and this same amplitude modulation is imparted to the X-rays generated from the electron beam dump. The radio frequency amplitude modulated X-rays propagating from the beam dump within the tube have a preferred conical angle of radiation from the tube volume toward the desired target volume to be examined.

The backscattered X-rays from the target volume will also contain this radio frequency modulation, and will intercept a scintillation material in front of the phase plate. The scintillation material will fluoresce across an optical frequency range that the micro channel plate is designed to amplify. The resulting amplitude of the micro channel plate light is detected by a detector array and recorded as a digital image. The resulting amplitude image is a "grayscale" representation of the magnitude of the difference between the radio frequency phase bias on the micro channel plate amplification response and the radio frequency modulated X-ray intensity from the target volume. A subsequent frame of micro channel plate image data with a 90 degree phase difference between the transmitted X-ray and micro channel plate modulation is recorded.

The ratio of the two recorded images creates a resulting image that has a grayscale response proportional to range, rather than X-ray return amplitude. By taking the arctangent of the ratio of the two images, precise range dependent grayscale increments can be resolved numerically.

Portions of this disclosure include discussion of "images". These images are shown in a human-perceptible form, i.e., in a hard copy. Note that this presentation is for the sake of illustration. The images are actually collections or sets of ordered data. In the illustrated embodiments, the data is three-dimensional. The images may be rendered to make them perceptible by image analysts in some embodiments. For example, the images may be rendered for output in hard copy, or they may be rendered and displayed electronically. However, some embodiments of the invention may be practiced automatically, that is, without human interaction. Thus, some embodiments may be practiced without the images being so rendered.

In one aspect, the present invention is a software implemented method for processing the received backscatter. FIG. 1 shows selected portions of the hardware and software architecture of a computing apparatus 100 such as may be employed in some aspects of the present invention. The computing apparatus 100 includes a processor 105 communicating with storage 110 over a bus system 115. The storage 110 may include a hard disk and/or random access memory ("RAM") and/or removable storage such as a floppy magnetic disk 117 and an optical disk 120.

The storage 110 is encoded with a images 125. The images 125 are acquired as discussed elsewhere in this disclosure.

The storage 110 is also encoded with an operating system 130, user interface software 135, and an application 165. The user interface software 135, in conjunction with a display 140, implements a user interface 145. The user interface 145 may include peripheral I/O devices such as a keypad or keyboard 150, a mouse 155, or a joystick 160. The processor 105 runs under the control of the operating system 130, which may be practically any operating system known to the art. The application 165 is invoked by the operating system 130 upon power up, reset, or both, depending on the implementation of the operating system 130. The application 165, when invoked, performs the method of the present invention. The user may invoke the application in conventional fashion through the user interface 145.

Figure 2:
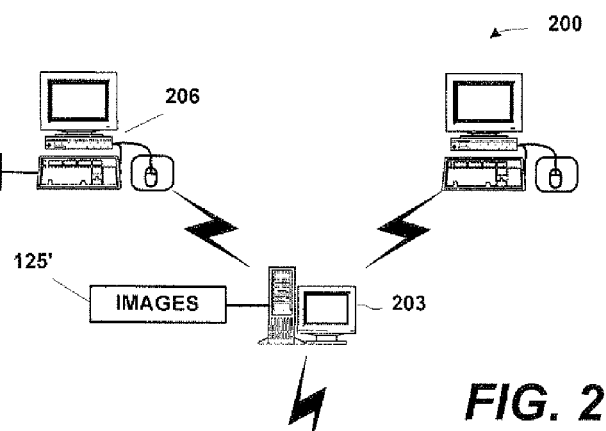
FIG. 2 illustrates a computing system on which some aspects of the present invention may be practiced in some embodiments.

Note that there is no need for the images 125 to reside on the same computing apparatus 100 as the application 165 by which it is processed. Some embodiments of the present invention may therefore be implemented on a computing system, e.g., the computing system 200 in FIG. 2, comprising more than one computing apparatus. For example, the images 125 may reside in a data structure residing on a server 203 and the application 165' by which it is processed on a workstation However, there is no requirement that the computing system 200 be networked. Alternative embodiments may employ, for instance, a peer-to-peer architecture or some hybrid of a peer-to-peer and client/server architecture. The size and geographic scope of the computing system 200 is not material to the practice of the invention. The size and scope may range anywhere from just a few machines of a Local Area Network ("LAN") located in the same room to many hundreds or thousands of machines globally distributed in an enterprise computing system.

Figure 3:
FIG. 3 illustrates still another embodiment of the present invention.

More typically, however, the computing apparatus of FIG. 1 will be embodied in a laptop 300, shown in FIG. 3, receiving the received backscatter from a sensor through a peripheral connection 303 from a handheld sensor 306. The processing may even be performed in the handheld sensor 306 itself in some embodiments.

A suitable handheld X-ray device suitable for modification to implement the presently disclosed technique is the LEXID™ X-ray Imaging Device available from Physical Optics Corporation, at 0600 Gramercy Place, Torrance, Calif.

90501-1821, Phone: 310-320-3088, Fax: 310-320-5961. Additional information is available over the World Wide Web of the Internet at their website <http://www.poc.com/default.asp>. Principles of operation, construction, and design are also disclosed in U.S. Pat. No. 7,231,017.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process is an electro-mechanical process. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 4A:
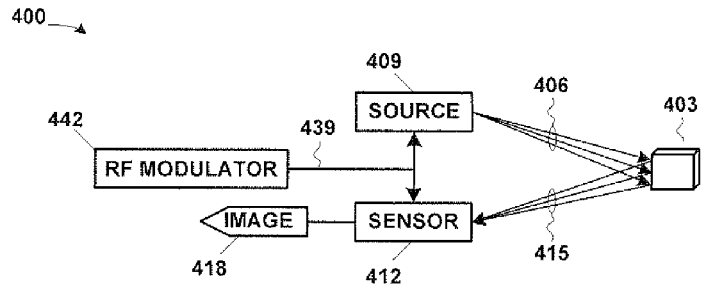
FIG. 4A conceptually depicts one particular embodiment of an X-ray RADAR imaging system.

FIG. 4A conceptually illustrates one particular embodiment of an X-ray RADAR imaging system 400. The system 400 is shown subjecting a target volume, or specimen, 403 to a plurality of X-rays 406 (only one indicated) generated and radio-frequency modulated as discussed further below. The system 400 comprises, in general, an X-ray source 409 and a sensor 412.

The X-ray source 409 is capable of emitting the plurality radio-frequency modulated X-rays 406 toward the target volume 403. The sensor 412 is capable of imaging a plurality of X-rays 415 (only one indicated) reflected from the target volume 403 and radio-frequency modulating the image. Radio frequency modulating the image impresses the image with a radio-frequency modulation. Upon imagining the X-rays 415, the sensor 412 then outputs the radio-frequency modulated image 418. The structure and operation of the X-ray source 409 and sensor 412 in the illustrated embodiment will now be discussed in further detail.

Figure 4B:
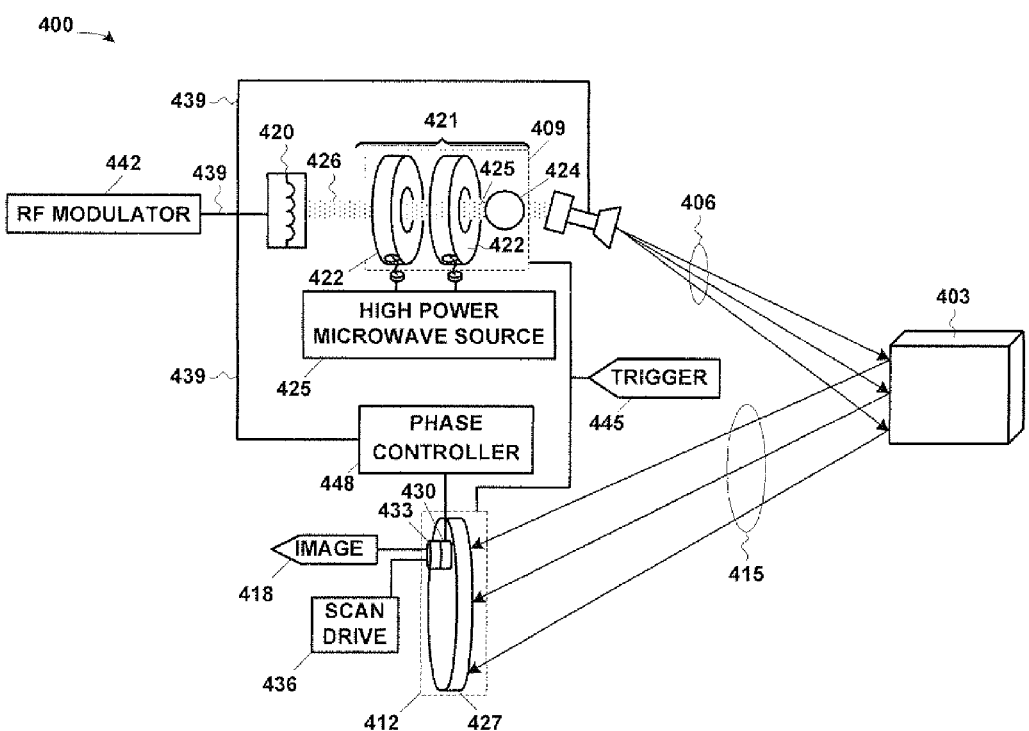
FIG. 4B conceptually illustrates one particular implementation of the X-ray RADAR imaging system of FIG. 4A.

Referring now to FIG. 4B, X-ray source 409 of the illustrated embodiment includes a filament 420, a radio-frequency modulated tube 421, and a high power microwave source 425. The filament 420 generates an electron beam 426 output to the radio frequency modulated tube 421. The radio frequency modulated tube comprises a pair of cavity resonator structures 422 and a high power (e.g., 2 Joules/pulse) microwave source 427 that give rise to the magnetic or electric fields that deflect the electron beam 425 and impart the intensity modulation of the electron beam 425 at radio frequency and an electron beam dump 424. The rotator 431 then imparts the radio frequency modulated x-rays 406 toward the target 403. Note that the rotator 431 may be omitted in some embodiments wherein such direction control is unnecessary or undesirable.

The radio-frequency modulated tube 421 is a high voltage, high energy tube. The radio-frequency modulated tube 421 may be, for example, a Klystron, such as is known in the art. Suitable implementations for the X-ray source 409 are commercially available off the shelf. For example, the NIR MCP-PMT and X-Ray Scintillator line of products offered by Hamamatsu Corp. offer several suitable alternatives. Hamamatsu Corp. can be reached in the United States at: 660 Foothill Rd, Bridgewater, N.J. 08807, ph: 908-231-0960; fax: 908-231-1218. Additional information can be obtained through those contacts or at www.hamamatsu.com over the World Wide Web of the Internet.

The sensor 412 of the illustrated embodiment comprises three parts. It includes a layer of a scintillating material 427 capable of intercepting the X-rays 415 emanating from the target volume 403 and fluorescing light (not shown) correlated thereto. A radio-frequency modulated microchannel plate 430 is located behind the scintillating material 427 to detect and amplify the fluoresced light. The microchannel plate 430 may also be referred to as a "phase plate". The amplification of the fluoresced light may also be described as "intensifying" the image, and so the microchannel plate 430 may be considered an "image intensifier". A detector array 433 is placed to detect the amplified fluorescent light output by the radio-frequency modulated microchannel plate 430. Again, suitable implementations are commercially available off the shelf, including the X-Ray Scintillator line of products offered by Hamamatsu Corp. mentioned above. Furthermore, information regarding imaging with such sensors and their fabrication is available from U.S. Pat. Nos. 6,531,225 and 6,762,420.

In the particular embodiment illustrated in FIG. 4B, the detector array 433 is not large enough to cover the entire back of the microchannel plate 430 simultaneously. The illustrated embodiment therefore includes a scan drive 436 that scans the detector array 433 from one position 500, shown in FIG. 5 in solid lines, to other positions 503 (only one indicated), shown in broken lines, across the back 431 of the microchannel plate 436. Such scan drives are known to the art and the scan drive 436 can be implemented using any suitable scan drive known to the art.

In operation, the electron beam energy 445 within the radio frequency, radio-frequency modulated tube 421 generates the X-rays 406 when electrons (not shown) strike and decelerate into the beam dump 424 within the tube 421. The electron beam energy 445 is amplitude modulated, in this particular embodiment, with the radio frequency phase information of the modulation signal 439. This same amplitude modulation is imparted to the X-rays 406 generated from the electron beam dump 424. A rotator 462 imparts a directionality to the propagating X-rays 406.

The radio frequency amplitude modulated X-rays 406 propagating from the electron beam dump 424 within the radio-frequency modulated tube 421 have a preferred conical angle α, conceptually illustrated in FIG. 4B, of radiation from the tube volume toward the desired target volume 403 to be examined. The expanding cone a of X-rays 406 from the virtual point source of the electron beam dump 424 within the radio-frequency modulated tube 421 provides a means of casting a magnified shadow of an object placed in the path between the X-ray source 409 and a scintillator material 427. The reflected X-rays 415 through the target volume will also contain this radio frequency modulation, containing energy modified by the materials in the object to be X-ray imaged.

The reflected X-rays 415 intercept the scintillation material 427 in front of the radio frequency modulated microchannel plate 430. The scintillation material 427 fluoresces across an optical frequency range that the microchannel plate 430 is designed to amplify. The scintillation material 427 has a time constant small enough that the amplitude of the fluorescence follows the radio frequency modulation rate. The resulting modulated microchannel plate light (not shown) is detected by the detector array 433 and recorded as the digital image 418.

The resulting amplitude image 418 is a set of ordered data that is a "grayscale" representation of the magnitude of the difference between the radio frequency phase bias on the microchannel plate 430 amplification response and the radio frequency modulated X-ray 406 intensity through the target volume 403. In practice, as series of images 418 are captured over time, each representing a sampling of the reflected X-rays 415. The image 418 may be stored, rendered for human perception, processed for some further use, or any combination thereof.

For a given image 418, a subsequent frame of microchannel plate image data with a 90° phase difference between the transmitted X-ray and microchannel plate modulation is recorded. That is, between two successive images 418, there is a 90° phase difference between those quantities. This is implemented by the phase controller 448, first shown in FIG. 4B and better illustrated in FIG. 4C. As shown in FIG. 4C, a quadrature hybrid 450 receives the modulation signal 439 from the RF modulator 442, shown in FIG. 4B. The quadrature hybrid 450 then, responsive to the modulation signal 439, outputs either a 0° phase offset control signal 453 or a 90° phase offset control signal 456 to a switch 459. The switch 459 then, in response to the phase offset control signals 453, 456, outputs a phase control signal 461 to control phase offset of the microchannel plate 430.

The ratio of the two recorded images 418 creates a resulting image (not shown) that has a grayscale response proportional to range, rather than X-ray return amplitude. By taking the arctangent of the ratio of the two images 418, precise range-dependent grayscale increments can be resolved numerically. To that end, the X-ray RADAR imaging system 400 shown in FIG. 4B will typically be deployed in association with a computing apparatus 600, shown in FIG. 6. The computing apparatus 600 in the illustrated embodiment is a stand-alone work station. In alternative embodiments, the computing apparatus may be embedded in the apparatus 400 or may be part of a larger computing system. Instead of a workstation, the computing apparatus could be implemented in a desktop, laptop, notebook, etc., in other embodiments. The present invention admits wide variation in the implementation of the computing apparatus 600.

Figure 7:
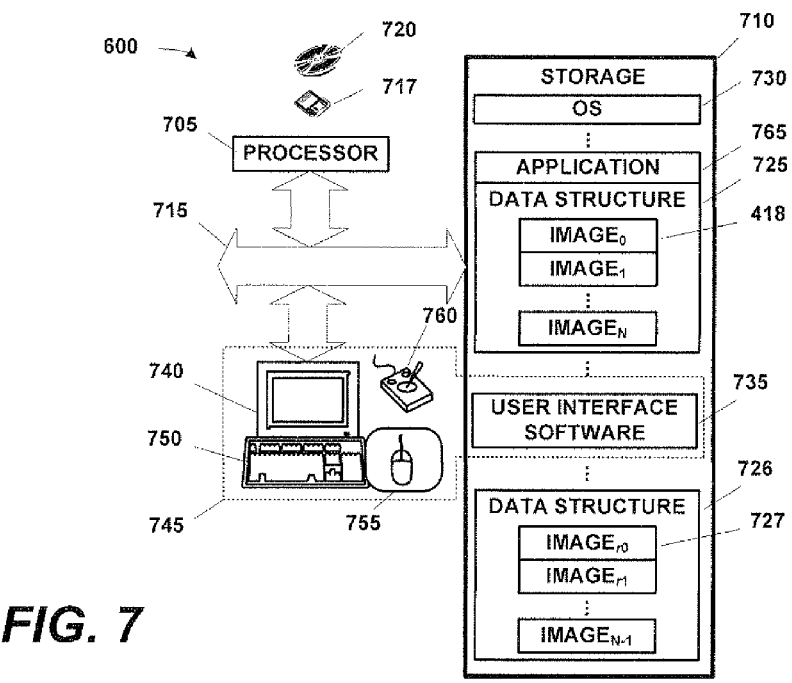
FIG. 7 shows selected portions of the hardware and software architecture of a computing apparatus such as may be employed in some aspects of the embodiments disclosed herein.

In one aspect, the present invention is a software implemented method for generating an X-ray image that has a grayscale response proportional to range. FIG. 7 shows selected portions of the hardware and software architecture of the computing apparatus 600, first shown in FIG. 6, such as may be employed in some aspects of the present invention.

The computing apparatus 600 includes a processor 705 communicating with storage 710 over a bus system 715.

The present invention admits wide variation in the implementation of the processor 705. Certain types of processors may be more desirable than others for some embodiments. For instance, a digital signal processor ("DSP") or graphics processor may be more desirable for the illustrated embodiment than will be a general purpose microprocessor. Other video handling capabilities might also be desirable. For instance, a Joint Photographic Experts Group ("JPEG") or other video compression capability and/or multi-media extension may be desirable. In some embodiments, the processor 705 may be implemented as a processor set, such as a microprocessor with a graphics co-processor, particularly for server architectures.

The storage 710 may be implemented in conventional fashion and may include a variety of types of storage, such as a hard disk and/or random access memory ("RAM") and/or removable storage such as a magnetic disk (not shown) or an optical disk (also not shown). The storage 710 will typically involve both read-only and writable memory. The storage 710 will typically be implemented in magnetic media (e.g., magnetic tape or magnetic disk), although other types of media may be employed in some embodiments (e.g., optical disk). The storage 710 may also employ various virtual memory and other memory management techniques. The present invention admits wide latitude in implementation of the storage 710 in various embodiments. In the illustrated embodiment, the storage 710 is internal memory implemented in a hard disk main memory, RAM, and in cache.

The bus system 715 will also vary widely by implementation. Depending upon the implementation, the bus system 715 may comprise an internal bus, a network backbone, or some combination thereof. For example, if the computing apparatus 600 is instead embedded with the X-ray RADAR imaging system 400, the bus system 715 may be implemented as an internal bus. On the other hand, if the computing apparatus 600 is but a part of a larger computing system across which the computing functionalities are distributed, then some type of external bus—i.e., a network backbone—will be employed. Either way, the bus system 715 may be implemented using conventional technologies.

The storage 710 is also encoded with an operating system ("OS") 730, user interface software 735, and an application 765. The user interface software 735, in conjunction with a display 740, implements a user interface 745. The user interface 745 may include peripheral input/output devices such as a keypad or keyboard 750, a mouse 755, or a joystick 760. The processor 705 runs under the control of the operating system 730, which may be practically any operating system known to the art. The application 765 may be invoked by the operating system 730 upon power up, reset, or both, depending on the implementation of the operating system 730. The application 765, when invoked, performs the method of the present invention. The user may also invoke the application 765 in conventional fashion through the user interface 745.

The storage 710 is also encoded with two data structures 725, 726. The data structure 725 contains the images 418 (only one indicated) that are acquired as described above. The data structure 726 contains the resultant images 727 (only one indicated) generated by the application 765 through the process generally described above. Thus, each resultant image 727 is an X-ray image that has a grayscale response proportional to range. The data structures 725, 726 may be implemented in any suitable type of data structure known to the art, such as a database, a list, or a queue. The data structures 725, 726 may be designed for long term storage of the images 418, 727 or to temporarily buffer them, depending on the implementation.

As mentioned above, the hardware and software architecture shown in FIG. 7 is exemplary only, and may find wide variation across numerous alternative embodiments. A good example of such variation is the implementation of the data structures 725, 726 described immediately above. Another good example is in the application 765. In other embodiments, the functionality residing in the application 765 may instead repose in some other kind of software component, such as a script, a daemon, etc.

There similarly may be variation in the situs of the various elements of the software aspects of the architecture. For example, there is no need for the images 418, 727 to reside on the same computing apparatus 600 or to reside on the same computing apparatus 600 as the application 765 by which they are processed and created. Some embodiments of the present invention may be implemented on a computing system, e.g., the computing system 800 in FIG. 8, comprising more than one computing apparatus. The computing system 800 employs a networked client/server architecture, but other architectures may be used.

Figure 8:
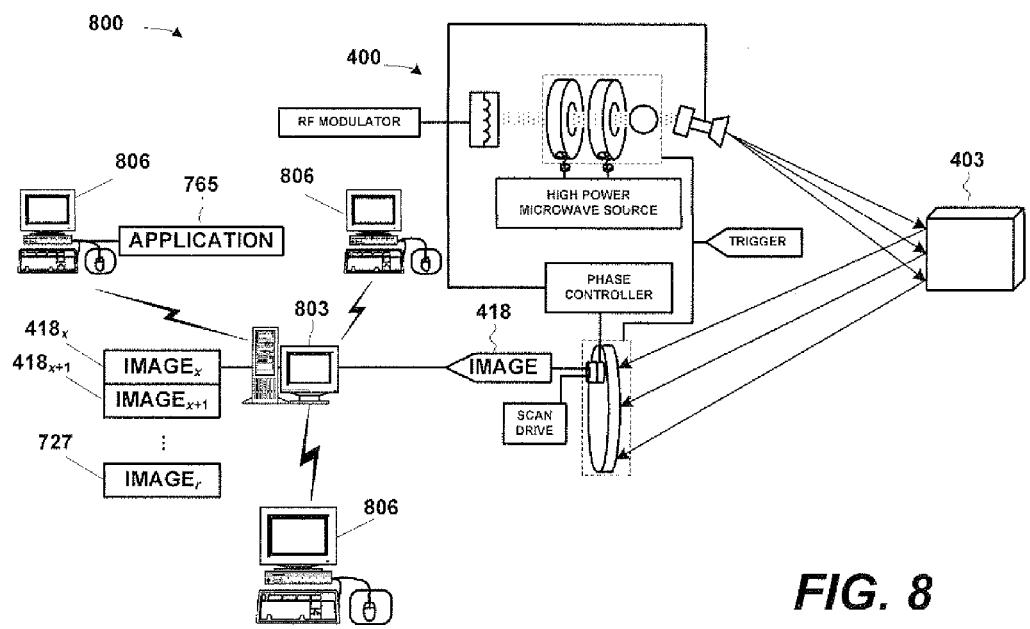
FIG. 8 illustrates a computing system on which some aspects of the illustrated embodiments may be practiced in some implementations.

In the embodiment of FIG. 8, the images 418, 727 (only one of each indicated) all reside in a data structure (not shown) residing on a server 803. The application 765 by which they are processed, however, resides on a workstation 806. Furthermore, although the images 418, 727 are all shown residing on the server 803, there is no requirement that they reside together. The images 418 might reside on the server 803 while the resultant images 727 might reside on the workstation 806. The invention admits wide variation in this respect.

Note that there is no requirement that the computing system 800 be networked. Alternative embodiments may employ, for instance, a peer-to-peer architecture or some hybrid of a peer-to-peer and client/server architecture. The size and geographic scope of the computing system 800 is not material to the practice of the invention. The size and scope may range anywhere from just a few machines of a Local Area Network ("LAN") located in the same room to many hundreds or thousands of machines globally distributed in an enterprise computing system.

Figure 9A:
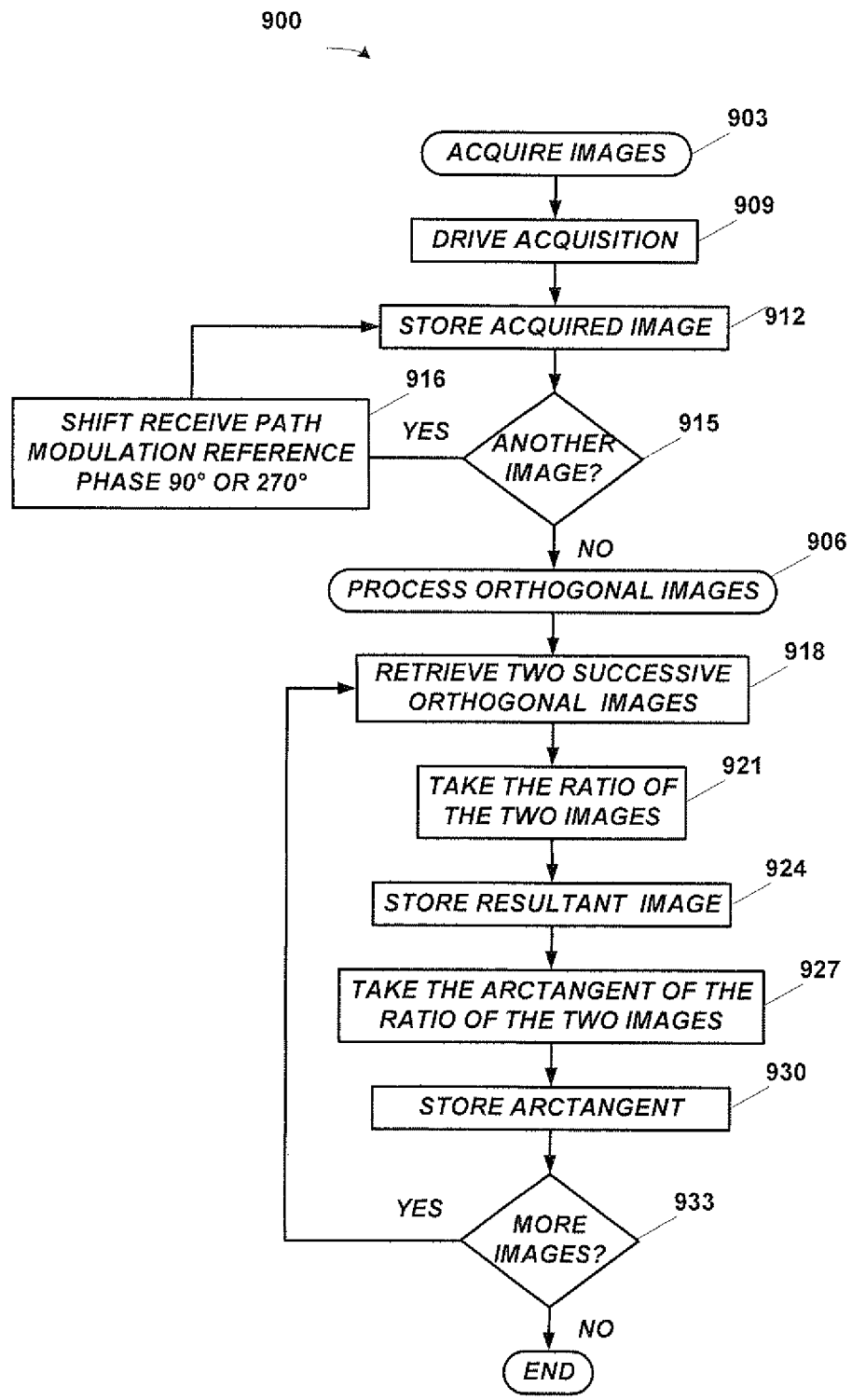
FIG. 9A is a flowchart of one particular embodiment of method for acquiring and processing X-ray RADAR images.

Turning now to both FIG. 6 and FIG. 9A, in operation, the application 765 of the illustrated embodiment executes the process 900. The process 900 is performed in two parts—image acquisition (at 903) and image processing (at 906). In this particular embodiment, all acquisition occurs prior to processing. Alternative embodiments may "process on the fly", or process the images 418, shown in FIG. 4B, as they are acquired. The difference will create some differences in handling having both advantages and disadvantages relative to the illustrated embodiment. Those in the art having the benefit of this disclosure will appreciate not only these relative advantages and disadvantages, but also the differences in handling and will be able to implement such alternatives should they wish to do so.

The application 765 first drives (at 909) the acquisition of the images 418. Successive images will be orthogonal in the sense that they are taken with 90° shifts in receive path modulation between two successive images 418. That is, one image will be RF biased without a phase offset and the next will be RF biased with a 90° phase offset by virtue of the RF modulation of the sensor 412 as described above. This includes generating and transmitting the control signals for the X-ray trigger, the RF modulation, and the scanning and detection as described above.

Figure 12:
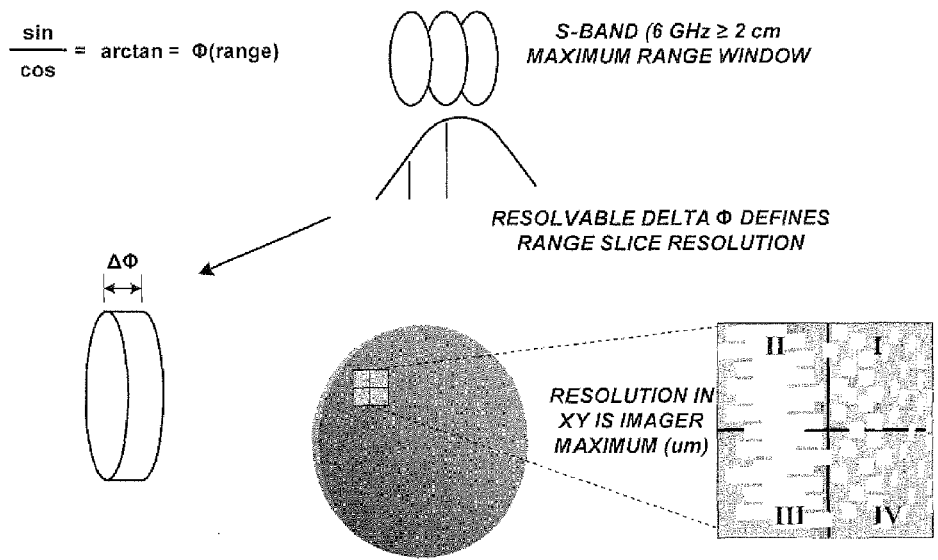
FIG. 12 graphically represents the range slicing practice in the illustrated embodiments.

The successive images 418 represent "range slicing" through range gating as a function of amplitude. This is graphically presented in FIG. 12 for one particular embodiment. The resolvable difference, which will be implementation specific, between successive images 418 will determine the range slice resolution.

The images 418 are captured over time and stored (at 912). This continues until all the images 418 are captured and stored (at 915). Note that, after capturing any given image 418, the receive path modulation reference phase is shifted (at 916) 90° or 270° before storing (at 912) the next image 418.

Once acquisition (at 903) is finished, processing (at 906) begins. The application 765 processes the images 418 by first retrieving (at 918) two successive images 418. "Successive" in this instance means they follow one another in time at acquisition. As noted above, those two images 418 will exhibit a 90° phase difference between the transmitted X-ray and microchannel plate modulation. Consequently, the ratio of the two images 418 creates a resulting image 727 that has a grayscale response proportional to range, rather than X-ray return amplitude.

The application 765 takes the ratio (at 921) and stores (at 924) the resultant image 727. The application 765 then takes (at 927) the arctangent of the ratio of the two images 418 to numerically resolve precise range-dependent grayscale increments of the resultant image 727 and stores (at 930) them. The application does this for each of pair of images 418 (at 933) until there are no more pairs of images 418. The process continues (at 933), in this embodiment, until all images 418 are acquired. Typically, the number of images 418 will be no less than two and no more than three, but more than three images may be used in alternative embodiments.

A sequence range images of at least three different RF modulation frequencies can be used to remove range ambiguities from the range images. Only those grayscale artifacts in each of the at least three images, which satisfy a common range solution, will be kept in the resulting composite grayscale image. In this way, grayscale artifacts that are outside of a given absolute range from the radar system are discarded from the image. This is a method of range gating in, in order to reduce "clutter" signals and improve image quality within the desired range gate from the radar system.

Figure 14:
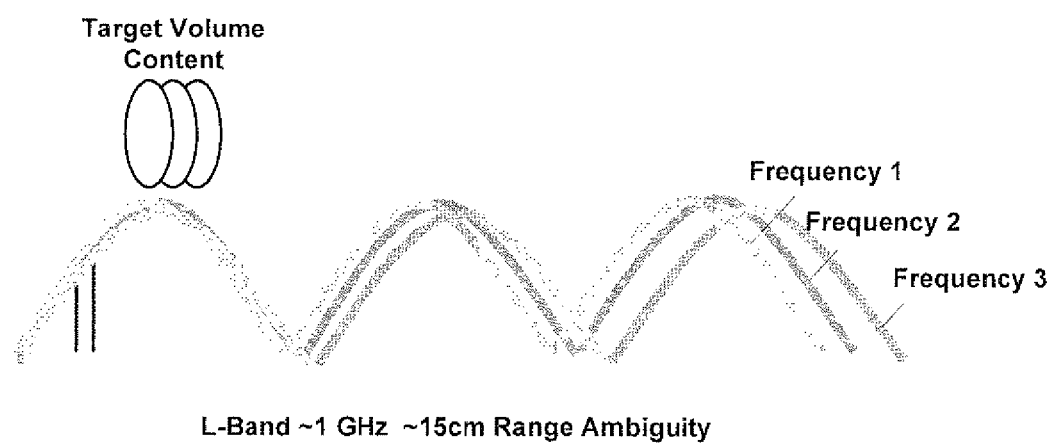
FIG. 14 graphically illustrates range gating in the present context.

With a single RF frequency, one can have range ambiguities, which fall outside the desired range. The range ambiguity occurs every half wavelength of the RF modulation wavelength. By taking three successive range images, each at a slightly different RF modulation frequency, one can solve for only those grayscale "arctangent" results, that fall within the desired half-wavelength, centered on a desired absolute range to target. This is how to form a ½ wave "range gate" with the X-ray radar as is graphically illustrated in FIG. 14.

Those in the art having the benefit of this disclosure will appreciate that other range gating techniques may be employed. For example, one may time the detection relative to the trigger to window the receipt of the backscattered X-rays. In these embodiments, the range gating is therefore not performed in processing as is the case with the illustrated embodiments.

Thus, in one aspect, the invention includes a method 900', shown in FIG. 9B. The method 900 is a computer-implemented method for generating an X-ray image that has a grayscale response proportional to range. The method 900 comprises (at 910) acquiring two temporally successive, radio frequency modulated, X-ray images; and (at 920) taking the arctangent of the ratio of the two images.

Note, however, that the method 900 is but one particular embodiment by which the method of the invention may be practiced. For example, in alternative embodiments, an image can be taken without transmit or receive modulation, prior to or successive to the phase modulated images, to improve extraction of the phase information. Still other alternative embodiments may use two successive orthogonal phase modulated images, to be added together, or processed as "square root of the sum of the squares" of the intensities of the successive orthogonal phase images to establish a reference image level to improve extraction of phase information from intensity artifacts in the image. This can be done in place of the unmodulated image step in process just described immediately above in this paragraph, or in addition to the unmodulated image.

The combination of the x-ray energy frequency and the range slicing described above produces improved image contrast. This improved image contrast can provide image from which items within a container of some sort can more readily be identified relative to conventional approaches.

Thus, in one aspect, the present invention provides a method, such as the method 1000 illustrated in FIG. 10. The method 1000 comprises modulating (at 1010) an X-ray signal with a first radio frequency and with a second radio frequency. The modulated X-ray signal is then transmitted (at 1020) into a field of view. Backscatter from the transmitted X-ray signal is received (at 1030) and processed (at 1040) to determine a range to a target in the field of view.

As noted above, some aspects of the method are software implemented. Thus, in one aspect, a software component (e.g., the application 765, in FIG. 7) performs a method such as the method 1100 illustrated in FIG. 11. The method 1100 comprises receiving (at 1110) data representative of backscatter from a radio frequency modulated X-ray signal, the X-ray signal being radio frequency modulated with a first frequency and with a second frequency. The received backscatter data is then processed (at 1120) to determine a range to a target.

Figure 13:
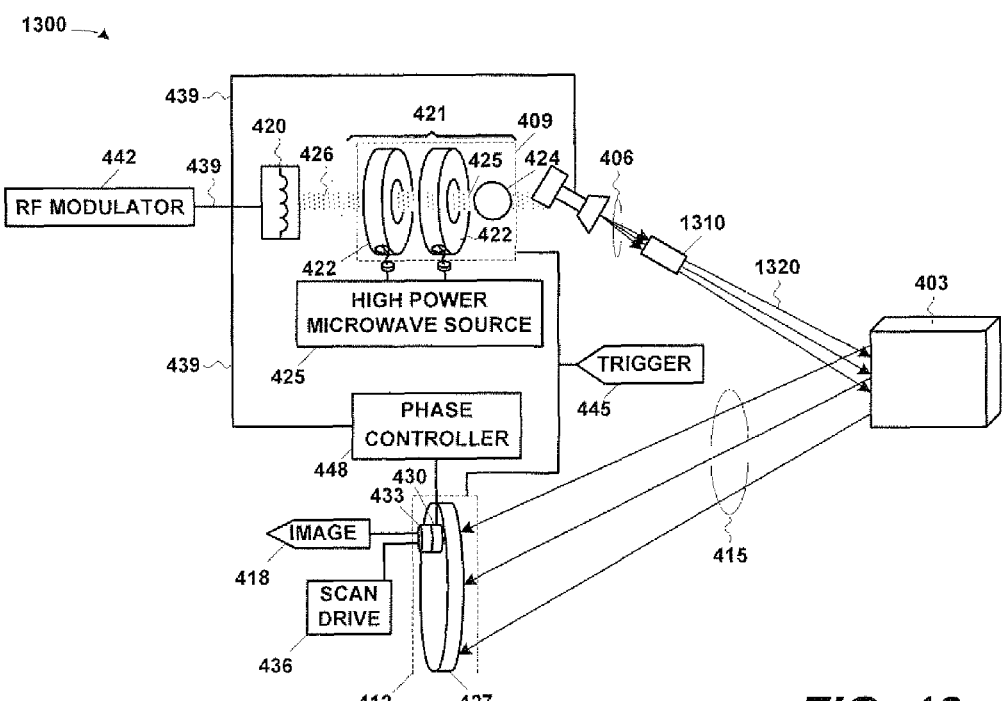
FIG. 13 depicts an alternative embodiment better suited for operation over longer ranges.

FIG. 13 depicts and embodiment alternative to that shown in FIG. 1A-FIG. 1C in that the apparatus 1300 employs an X-ray telescope 1310 to collimate the X-rays 406. The collimation narrows that resultant beam 1320. This provides greater resolution over longer ranges than would be otherwise be available without the collimation. Thus, embodiments operating over relatively longer ranges might wish to employ such a technique to maintain or improve the resultant resolution. The present invention also admits of other variations in still other embodiments driven by similar operational concerns not otherwise disclosed herein.

Thus, in one aspect, the presently disclosed technique combines existing range gating methods used in optical radar or light detection and ranging ("LIDAR") with a novel method of x-ray generation using high energy radio frequency sources. The invention allows portable 3D imaging with reduction in radiation exposure, and improved image quality due to range gating reduction of interfering X-ray energy.

The apparatus of the presently disclosed technique and its constituent parts are "capable of" their various functionalities in the sense that they perform their function when properly powered and controlled but do not do so in the absence of power and control. Thus, in operation, the apparatus is "capable of" performing the associated methods disclosed herein. The apparatus is otherwise "capable of" performing the associated methods.

The following documents are hereby incorporated by reference for all purposes as if set forth verbatim herein:

U.S. Provisional Application Ser. No. 61/107,924, entitled "X-Ray RADAR", filed Oct. 23, 2008, in the name of the inventor J. Richard Wood;

U.S. application Ser. No. 12/541,539, entitled "X-Ray Explosive Imager", filed Aug. 14, 2009, in the name of the inventor J. Richard Wood;

U.S. Pat. No. 4,935,616, entitled, "Range Imaging Laser RADAR", issued Jun. 19, 1990, to The United States of America as assignee of the inventor Marion W. Scott, for its teachings regarding RF amplitude modulation using MCPs and range gating the receipt of backscatter;

M. R. Carter, et al., "A Microchannel Plate Intensified, Sub-nanosecond, X-ray Imaging Camera", 41 *Physica Scripta* 390-395 (1990), for its teachings regarding the design, construction, and operation of MCP assemblies;

U.S. Pat. No. 7,231,017, entitled "Lobster Eye X-ray Imaging System and Method of Fabrications Thereof", issued Jun. 12, 2007, to Physical Optics Corporation as assignee of the inventors Michael Gertsenshteyn, et al., in its entirety and for all of its teachings; and U.S. application Ser. No. 11/191,095, entitled "Lobster Eye X-ray Imaging System and Method of Fabrications Thereof", filed Jul. 27, 2005, in the name of the inventors Michael Gertsenshteyn, et al., and assigned to Physical Optics Corporation, and published as U.S. Patent Publication 2007/0025512 on Feb. 1, 2007, in its entirety and for all of its teachings.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
modulating an X-ray signal with a first radio frequency and with a second radio frequency;
transmitting the modulated X-ray signal into a field of view;
receiving backscatter from the transmitted X-ray signal; and
processing the received backscatter to determine a range to a target in the field of view.

2. The method of claim 1, further comprising range-gating the received backscatter.

3. The method of claim 1, wherein processing the received backscatter yields a three-dimensional image.

4. The method of claim 3, wherein the three-dimensional image is rendered.

5. The method of claim 1, wherein processing the received backscatter includes:
determining the ratios between the data representing backscatter of the X-ray signal modulated at the first frequency and the data representing backscatter of the X-ray signal modulated by the second frequency; and
numerically resolving the ratio into range dependent increments.

6. The method of claim 5, wherein numerically resolving the ratios includes taking the arctangent of the ratios.

7. The method of claim 1, further comprising rendering the backscatter data.

8. The method of claim 1, further comprising collimating the modulated X-ray signal before the transmitting.

9. An X-ray RADAR apparatus, comprising:
  means for modulating an X-ray signal with a first radio frequency and with a second radio frequency;
  means for transmitting the modulated X-ray signal into a field of view;
  means for receiving backscatter from the transmitted X-ray signal; and
  means for processing the received backscatter to determine a range to a target in the field of view.

10. The X-ray RADAR apparatus of claim 9, wherein the modulating means comprises a radio frequency modulator generating a modulation signal provided to the transmitting means and the receiving means.

11. The X-ray RADAR apparatus of claim 9, wherein the transmitting means comprises an X-ray source.

12. The X-ray RADAR apparatus of claim 9, wherein the receiving means comprises an X-ray receiver.

13. The X-ray RADAR apparatus of claim 9, wherein the processing means comprises:
  a processor;
  a bus system;
  a storage communicating with the processor over the bus system; and
  an application residing on the storage that, when invoked by the processor, performs a software implemented method, comprising:
    receiving data representative of backscatter from a radio frequency modulated X-ray signal, the X-ray signal being radio frequency modulated with a first frequency and with a second frequency; and
    processing the received backscatter data to determine a range to a target.

14. The X-ray RADAR apparatus of claim 9, further comprising means for range-gating the received backscatter.

15. The X-ray RADAR apparatus of claim 14, wherein the range gating means comprises the processing means.

16. The X-ray RADAR apparatus of claim 9, wherein the processing means:
  determines the ratios between the data representing backscatter of the X-ray signal modulated at the first frequency and the data representing backscatter of the X-ray signal modulated by the second frequency; and
  numerically resolves the ratio into range dependent increments.

17. The X-ray RADAR apparatus of claim 9, further comprising means for collimating the modulated X-ray signal before the transmitting.

18. The X-ray RADAR apparatus of claim 17, wherein the collimating means comprises an X-ray telescope.

19. A software implemented method, comprising:
  receiving data representative of backscatter from a radio frequency modulated X-ray signal, the X-ray signal being radio frequency modulated with a first frequency and with a second frequency; and
  processing the received backscatter data to determine a range to a target,
  wherein the processing is performed by a processor.

20. The software implemented method of claim 19, wherein processing the received backscatter data includes:
  determining the ratios between the data representing backscatter of the X-ray signal modulated at the first frequency and the data representing backscatter of the X-ray signal modulated by the second frequency; and
  numerically resolving the ratio into range dependent increments.

21. The software implemented method of claim 20, wherein numerically resolving the ratios includes taking the arctangent of the ratios.

22. The software implemented method of claim 19, further comprising rendering the backscatter data.

23. The software implemented method of claim 19, further comprising range-gating the receipt of the backscatter.

24. The software implemented method of claim 19, wherein processing the received backscatter yields a three-dimensional image.

25. The software implemented method of claim 24, wherein the three-dimensional image is rendered.

26. A non-transitory program storage medium encoded with instructions that, when executed by a processor, perform a software implemented method, the program storage medium comprising:
  receiving data representative of backscatter from a radio frequency modulated X-ray signal, the X-ray signal being radio frequency modulated with a first frequency and with a second frequency; and
  processing the received backscatter data to determine a range to a target.

27. The program storage medium of claim 26, wherein processing the received backscatter data includes:
  determining the ratios between the data representing backscatter of the X-ray signal modulated at the first frequency and the data representing backscatter of the X-ray signal modulated by the second frequency; and
  numerically resolving the ratio into range dependent increments.

28. A computing apparatus, comprising:
  a processor;
  a bus system;
  a storage communicating with the processor over the bus system; and
  an application residing on the storage that, when invoked by the processor, performs a software implemented method, comprising:
    receiving data representative of backscatter from a radio frequency modulated X-ray signal, the X-ray signal being radio frequency modulated with a first frequency and with a second frequency; and
    processing the received backscatter data to determine a range to a target.

29. The computing apparatus of claim 28, wherein processing the received backscatter data includes:
  determining the ratios between the data representing backscatter of the X-ray signal modulated at the first frequency and the data representing backscatter of the X-ray signal modulated by the second frequency; and
  numerically resolving the ratio into range dependent increments.

30. An X-ray RADAR apparatus, comprising:
  a transmitter capable of:
    modulating an X-ray signal with a first radio frequency and with a second radio frequency; and
    transmitting the modulated X-ray signal into a field of view; and
  a receiver that, in operation, receives backscatter from the transmitted X-ray signal.

31. The X-ray RADAR apparatus of claim 30, further comprising a processing unit capable of processing the received backscatter to determine a range to a target in the field of view.

32. The X-ray RADAR apparatus of claim 31, wherein the processing unit comprises:

a processor;
a bus system;
a storage communicating with the processor over the bus system; and
an application residing on the storage that, when invoked by the processor, performs a software implemented method, comprising:
   receiving data representative of backscatter from a radio frequency modulated X-ray signal, the X-ray signal being radio frequency modulated with a first frequency and with a second frequency; and
   processing the received backscatter data to determine a range to a target.

33. The X-ray RADAR apparatus of claim 32, wherein processing the received backscatter data includes:
   determining the ratios between the data representing backscatter of the X-ray signal modulated at the first frequency and the data representing backscatter of the X-ray signal modulated by the second frequency; and
   numerically resolving the ratio into range dependent increments.

34. The X-ray RADAR apparatus of claim 30, wherein the transmitter comprises:
   a radio frequency modulator; and
   an X-ray source modulated by the radio frequency modulator.

35. The X-ray RADAR apparatus of claim 34, wherein the transmitter further includes a rotator.

36. The X-ray RADAR apparatus of claim 30, wherein the receiver comprises:
   a phase controller driven by a reference to modulation of the X-ray signal; and
   a detector receiving a reflection of the modulated X-ray signal in which successive images are captured 90° out of phase as determined by the phase controller.

* * * * *